(No Model.)

D. HIGHAM.
REGULATION OF ELECTRIC MOTORS.

No. 379,467. Patented Mar. 13, 1888.

Witnesses
William D. Conner
David S. Williams

Inventor
Daniel Higham
By his Attorneys
Howson and Sons

UNITED STATES PATENT OFFICE.

DANIEL HIGHAM, OF PHILADELPHIA, PENNSYLVANIA, ASSIGNOR TO THE HIGHAM ELECTRIC MOTOR COMPANY, OF SAME PLACE.

REGULATION OF ELECTRIC MOTORS.

SPECIFICATION forming part of Letters Patent No. 379,467, dated March 13, 1888.

Application filed June 29, 1887. Serial No. 242,840. (No model.)

*To all whom it may concern:*

Be it known that I, DANIEL HIGHAM, a citizen of the United States, and a resident of Philadelphia, Pennsylvania, have invented certain Improvements in the Regulation of Electric Motors, of which the following is a specification.

My invention relates to the construction of electric motors which have double-circuit field-magnets, or field-magnets with consequent poles; and the object of my invention is to so construct such motors as to provide for both automatic regulation and automatic maintenance of the non-sparking points.

The views in the accompanying drawings represent, diagrammatically, different forms of my improvement.

In the diagrams, A represents the armature and P the pole-pieces of the field-magnets E, which are wound with main field-coils F and distorting-coils D D', as hereinafter more fully set forth. The lines $a$ $a$ indicate the lines of neutrality in the magnetic fields in the several cases.

In the ordinary or simple form of motor, when in action, there is a diversion of the magnetic lines in the poles of the field-magnet, which is due to their close proximity to the armature-coils.

In certain applications for patent already filed by me, Serial Nos. 219,614 and 236,752, I have pointed out detriments resulting from this diversion of the magnetic lines in the pole-pieces of the field-magnets, and in a further application for patent, filed of even date herewith, I have set forth further detriments resulting from this diversion of the magnetic lines, together with means of remedying the difficulty. The means set forth in the said application consist, essentially, in applying to the pole-pieces of the field-magnets distorting-coils, in combination with laminations on the pole-piece faces, these laminations being transverse to the direction of rotation of the armature.

In my present invention I also laminate the polar faces of the field-magnets, as shown at $l$ in the diagrams, and in connection therewith I wind on the cores of the field-magnets, in addition to the regular field-coils, "distorting-coils," as they may be termed, which distorting-coils have the effect of modifying the positions of the consequent poles of the field-magnets, as hereinafter described.

Figure 1:
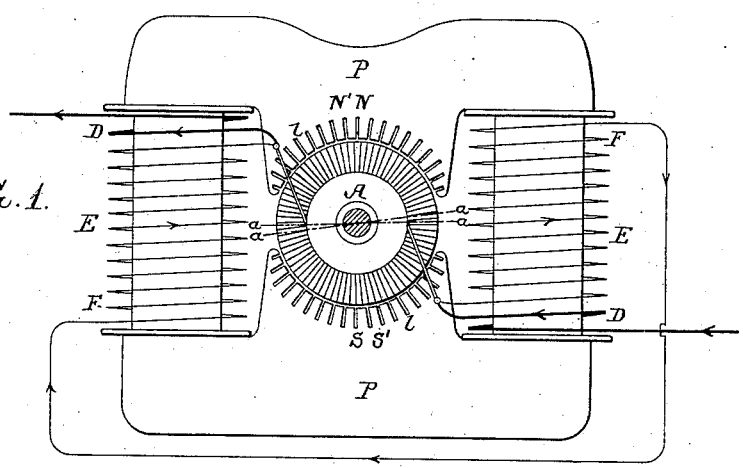
Figure 2:
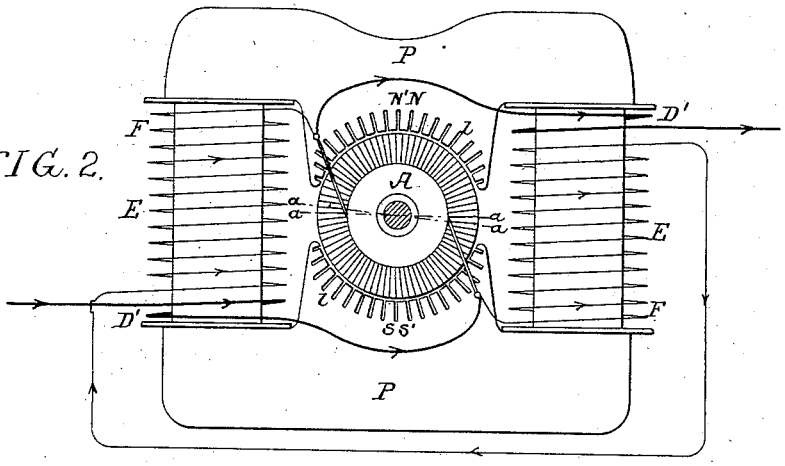
Figure 3:
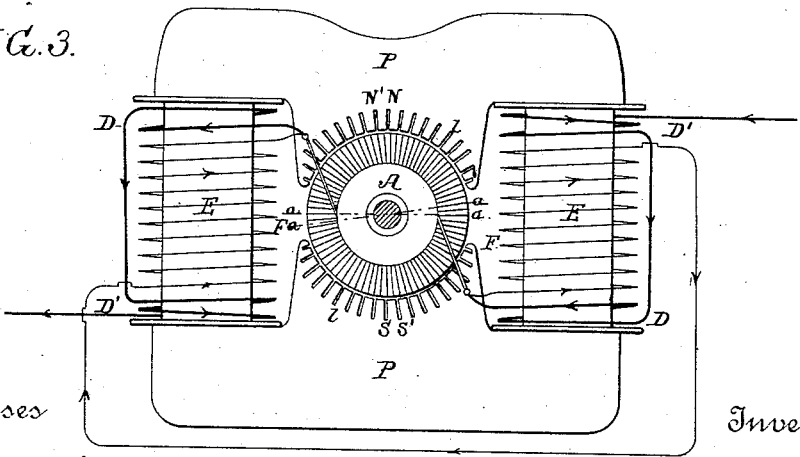

In the diagram Figure 1 I have shown the distorting-coils D on the field-magnet cores in series, while the main field-coils F are in shunt-circuit. The distorting and main coils are in this case wound to produce opposite polarities. In the modification Fig. 2 the distorting-coils D' are wound to produce the same polarities as the main coils F, while in the modification shown in the diagram Fig. 3 two sets of distorting-coils are shown at opposite ends of the field-magnet cores, one set, D, being wound to produce polarities the opposite of those produced by the main coils, while the set of coils D' are wound to produce the same polarities as the main coils. In each of these three diagrams N S indicate the consequent poles when the motor is running without load, while N' S' indicate the consequent poles when the motor is working under load. The action of these coils in connection with the laminations is similar to the action of the pole-piece coils and laminations described in my application filed of even date herewith. In other words, the effect will be to automatically maintain the magnetic field in the positions of least sparking at the commutator-brushes, and to provide an automatic regulation.

I claim as my invention—

An electric motor having a field-magnet with consequent poles and pole-piece faces laminated transversely to the direction of rotation of the armature, in combination with main coils and distorting-coils on the cores, substantially as and for the purpose set forth.

In testimony whereof I have signed my name to this specification in the presence of two subscribing witnesses.

DANIEL HIGHAM.

Witnesses:
WILLIAM D. CONNER,
HARRY SMITH.